(No Model.)
H. WOODWARD.
PRIMARY ELECTRIC BATTERY.
No. 379,552. Patented Mar. 13, 1888.
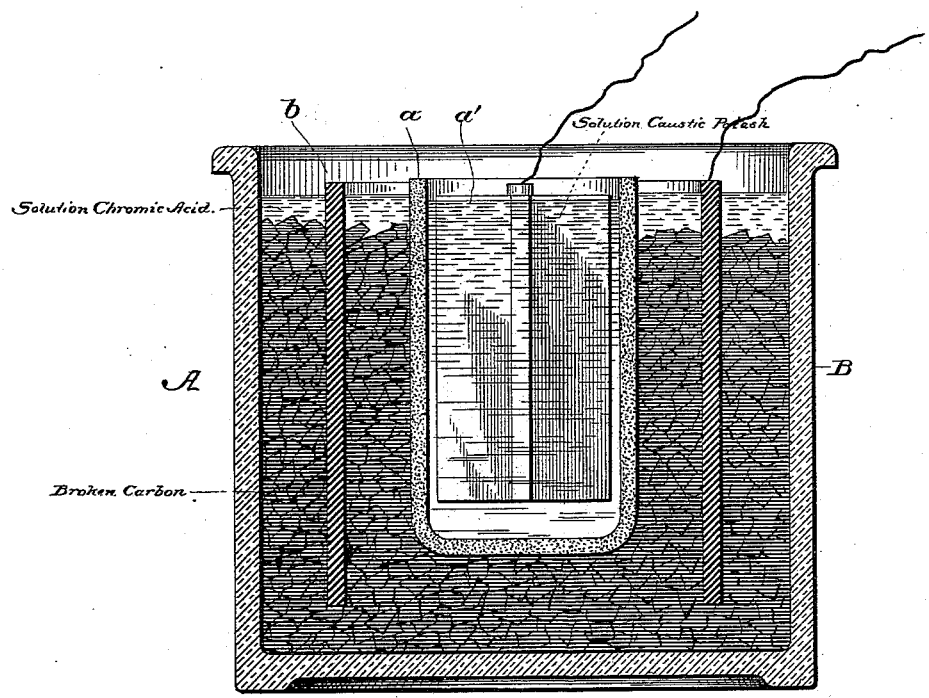
Witnesses:
Inventor
Henry Woodward,
by
his Attorney.

UNITED STATES PATENT OFFICE.

HENRY WOODWARD, OF DETROIT, MICHIGAN, ASSIGNOR, BY MESNE ASSIGNMENTS, TO THE WOODWARD ELECTRICAL COMPANY, OF SAME PLACE.

PRIMARY ELECTRIC BATTERY.

SPECIFICATION forming part of Letters Patent No. 379,552, dated March 13, 1888.

Application filed October 7, 1887. Serial No. 251,695. (No model.)

*To all whom it may concern:*

Be it known that I, HENRY WOODWARD, a subject of the Queen of Great Britain, residing at Detroit, in the county of Wayne and State of Michigan, but at present in the city of Toronto, Province of Ontario, Canada, have invented certain new and useful Improvements in Primary Electric Batteries; and I do hereby declare the following to be a full, clear, and exact description of the invention, such as will enable others skilled in the art to which it appertains to make and use the same.

My invention relates to primary electric batteries.

The object is to produce a battery in which by a novel combination of elements and an improved assemblage of solutions a high electro-motive force is obtained. Furthermore, the object is to produce a battery which will be efficient and durable in use and inexpensive to manufacture.

With these objects in view my invention consists in a jar, in the center of which is placed a porous cup provided with a series of connected zinc plates, which are immersed in a solution of caustic potash, the outer portion of the said cup being surrounded by pieces of broken carbon placed in close contact with a carbon plate and covered by a solution of chromic acid.

Furthermore, the invention consists in various novel details of construction, as hereinafter fully set forth.

In the accompanying drawing, forming part of the specification, and in which like letters of reference indicate corresponding parts, the figure is a sectional view of my invention, showing the porous cup, the zinc plates, the carbon plate, and the broken pieces of carbon.

Referring to the drawing, A represents a jar, in the center of which is placed a porous cup, $a$, containing a series of zinc plates, $a'$, these plates being connected together in order to present as large a surface as possible. In this cup is placed a solution of sea-salt, Epsom salt, or caustic potash, caustic potash being preferred.

To make the caustic-potash solution, a sufficient quantity of crude potash is boiled in water until the water is thoroughly saturated, which requires about three hours, when there is added a paste made of lime, and the whole is then boiled for about two hours longer, after which it is strained. It is then ready for use. The outer jar, B, is filled with broken pieces of carbon, in which is placed a carbon plate, $b$. Upon this carbon plate is poured a strong solution of chromic acid. By this construction of the elements and assemblage of solutions a battery of high electro-motive force is obtained.

Having thus fully described my invention, what I claim as new, and desire to secure by Letters Patent, is—

In a primary electric battery, the combination, with a porous cup provided with a series of connected zinc plates immersed in a solution of caustic potash, of an outer jar filled with broken carbon, the said jar having a carbon plate placed therein in contact with the broken carbon, the whole being covered with a solution of chromic acid, substantially as described.

In testimony whereof I affix my signature in presence of two witnesses.

HENRY WOODWARD.

Witnesses:
 JNO. S. ANDERSON,
 ADAM H. MEYERS.